United States Patent
Viswanathan Pillai et al.

(10) Patent No.: US 10,635,395 B2
(45) Date of Patent: Apr. 28, 2020

(54) ARCHITECTURE AND INSTRUCTION SET TO SUPPORT INTERRUPTIBLE FLOATING POINT DIVISION

(71) Applicant: TEXAS INSTRUMENTS INCORPORATED, Dallas, TX (US)

(72) Inventors: Prasanth Viswanathan Pillai, Bangalore (IN); Venkatesh Natarajan, Bangalore (IN); Alexander Tessarolo, Lindfield (AU)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 98 days.

(21) Appl. No.: 15/198,070

(22) Filed: Jun. 30, 2016

(65) Prior Publication Data

US 2018/0004485 A1 Jan. 4, 2018

(51) Int. Cl.
*G06F 7/487* (2006.01)

(52) U.S. Cl.
CPC .................. *G06F 7/4873* (2013.01)

(58) Field of Classification Search
CPC ......... G06F 7/4873; G06F 7/535–5375; G06F 2207/5352–5353; G06F 2207/5355
See application file for complete search history.

(56) References Cited

U.S. PATENT DOCUMENTS

| 4,398,244 A | * | 8/1983 | Chu | G06F 9/268 |
| | | | | 712/228 |
| 4,413,326 A | * | 11/1983 | Wilson | G06F 7/483 |
| | | | | 708/504 |
| 4,777,613 A | * | 10/1988 | Shahan | G06F 7/483 |
| | | | | 708/510 |
| 5,309,383 A | * | 5/1994 | Kuroiwa | G06F 7/5375 |
| | | | | 708/496 |
| 5,404,324 A | * | 4/1995 | Colon-Bonet | G06F 7/535 |
| | | | | 708/500 |
| 6,061,781 A | * | 5/2000 | Jain | G06F 7/535 |
| | | | | 708/552 |
| 6,782,405 B1 | | 8/2004 | Matula et al. | |

(Continued)

OTHER PUBLICATIONS

J. Fandrianto, "Algorithm for High Speed Shared Radix 4 Division and Radix 4 Square-Roof", Proc. 8th IEEE Symposium on Computer Arithmetic, pp. 73-79, 1987.*

(Continued)

*Primary Examiner* — Matthew D Sandifer
(74) *Attorney, Agent, or Firm* — Ebby Abraham; Charles A. Brill; Frank D. Cimino

(57) ABSTRACT

A processor (and method) includes a core that performs a floating point division through execution of various instructions. The instructions include a sign, exponent, and mantissa (SEM) separation instruction which causes the core to extract the sign, exponent and mantissa values from numerator and denominator floating point numbers. The instructions also include an unsigned mantissa division instruction which cause the core to iteratively perform a conditional subtraction operation to compute a value indicative of a mantissa of the quotient. The instructions further include a merge instruction that causes the core to generate a quotient floating point number using the extracted sign and exponent from the SEM separation instruction and the value indicative of the mantissa of the quotient.

11 Claims, 2 Drawing Sheets

(56) References Cited

U.S. PATENT DOCUMENTS

| | | | |
|---|---|---|---|
| 6,809,598 B1 | 10/2004 | Staszewski et al. | |
| 6,976,158 B2 * | 12/2005 | Catherwood | G06F 9/30065 |
| | | | 710/266 |
| 7,046,098 B2 | 5/2006 | Staszewski et al. | |
| 7,145,399 B2 | 12/2006 | Staszewski et al. | |
| 7,183,860 B2 | 2/2007 | Staszewski et al. | |
| 7,365,609 B2 | 4/2008 | Waheed et al. | |
| 7,532,679 B2 | 5/2009 | Staszewski et al. | |
| 7,570,182 B2 | 8/2009 | Sheba et al. | |
| 7,920,081 B2 | 4/2011 | Waheed et al. | |
| 8,045,670 B2 | 10/2011 | Waheed et al. | |
| 8,655,937 B1 | 2/2014 | Vanderspek | |
| 8,779,817 B2 | 7/2014 | Jakobsson | |
| 2003/0037088 A1 * | 2/2003 | Gupte | G06F 7/535 |
| | | | 708/700 |
| 2008/0315928 A1 | 12/2008 | Waheed et al. | |
| 2009/0081984 A1 | 3/2009 | Gailus et al. | |
| 2011/0148676 A1 | 6/2011 | Waheed et al. | |
| 2012/0244824 A1 | 9/2012 | Entezari et al. | |
| 2013/0179664 A1 | 7/2013 | Olson et al. | |
| 2014/0091844 A1 | 4/2014 | Jakobsson | |
| 2015/0249455 A1 | 9/2015 | Burg et al. | |
| 2016/0182262 A1 | 6/2016 | Leistner et al. | |
| 2017/0315779 A1 * | 11/2017 | Tessarolo | G06F 7/535 |

OTHER PUBLICATIONS

Advanced Micro Devices Inc., "Am29331 16-Bit Microprogram Sequencer", Publication #05729, Rev. E, 1987 (Year: 1987).*

ARM, "ARM Cortex-M4 Processor Technical Reference Manual", Revision r0p1, Section 3.3.1, 2015 (Year: 2015).*

Infineon Technologies, "C167CR Derivatives", User's Manual, V 3.1, Mar. 2000 (Year: 2000).*

Infineon Technologies, "Instruction Set Manual for the C1666 Family of Infineon 16-Bit Single-Chip Microcontrollers", User's Manual, v 2.0, Mar. 2001 (Year: 2001).*

\* cited by examiner

ARCHITECTURE AND INSTRUCTION SET TO SUPPORT INTERRUPTIBLE FLOATING POINT DIVISION

BACKGROUND

Some applications, such as many digital signal processing (DSP) applications, benefit from support for double precision floating point division operation. Some implementations may include a look-up table-based curve fitting approach, functional iterations based on an initial estimate employing a Newton Raphson technique, and conditional subtraction-based software approaches. Achieving double precision with a maximum error of, for example, 0.5 ULP as defined by the IEEE754 standard may involve significant overhead and/or latency using one or more of the above-mentioned techniques.

SUMMARY

In some embodiments, a processor includes a core that is configured to perform a floating point division operation that includes a sign, exponent, and mantissa (SEM) separation instruction which causes the core to extract the sign, exponent and mantissa values from numerator and denominator floating point numbers, an unsigned mantissa division instruction which cause the core to iteratively perform a conditional subtraction operation to compute a value indicative of a mantissa of the quotient, and a merge instruction that causes the core to generate a quotient floating point number using the extracted sign and exponent from the SEM separation instruction and the value indicative of the mantissa of the quotient.

Another embodiment is directed to a processor that includes a core and a first register configured to store a floating point numerator and a second register configured to store a floating point denominator. The core is configured to perform a floating point division operation using the first and second registers, the floating point division operation includes multiple executions of an unsigned mantissa division instruction which causes the core to iteratively perform a conditional subtraction operation using the first and second registers to compute a value indicative of a mantissa of the quotient.

Yet another embodiment is directed to a method implemented on a processor core. The method includes executing a sign, exponent, and mantissa (SEM) separation instruction which causes the core to extract the sign, exponent and mantissa values from numerator and denominator floating point numbers, executing an unsigned mantissa division instruction which cause the core to iteratively perform a conditional subtraction operation to compute a value indicative of a mantissa of the quotient, and executing a merge instruction that causes the core to generate a quotient floating point number using the extracted sign and exponent from the SEM separation instruction and the value indicative of the mantissa of the quotient.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

The disclosed embodiments are directed to a technique for implementation of floating point division in a processor through execution of various instructions. In one example, the instruction includes a sign, exponent, and mantissa (SEM) separation instruction which extracts the sign, exponent and mantissa values from the numerator and denominator floating point values. The mantissas of the numerator and denominator are then divided through the repeated execution of an unsigned mantissa division instruction. The unsigned mantissa division instruction may perform three iterations of the mantissa division process, and the instruction is executed multiple times to obtain sufficient bits for the mantissa of the quotient. A merge instruction then may be executed to merge together the sign, exponent and mantissa values to form the resulting quotient.

Some of the examples described herein pertain to a technique for 64-bit floating point division in which bit [63] includes a sign bit, bits [62:52] includes the exponent bits, and bits [51:0] includes the mantissa with an implicit 1. That is, the mantissa may be in the form 1.M and the leading 1 is not explicitly included in the 64-bit representation, but instead is implied in this example. The floating point division techniques described herein can be extended to other floating point representations with fewer or more bits, different number of exponent and mantissa bits, etc.

Figure 1:
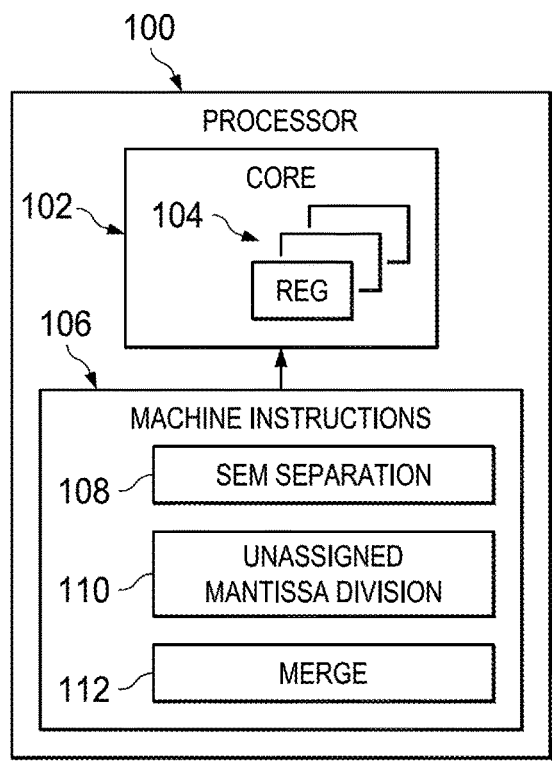
FIG. 1 shows a block diagram of a processor which can execute instructions including a sign, exponent, and mantissa separation instruction, an unsigned mantissa division instructions, and a merge instruction in accordance with various examples.

FIG. 1 shows a block diagram of a processor 100 in accordance with an embodiment. The processor 100 as shown includes a core 102, which contains multiple registers 104. The core 102 may contain other hardware components as well such as subtractors, comparators, fetch logic, decode logic, arithmetic logic units (ALUs), etc. The core 102 may execute various machine instructions 106, which may be stored in memory within, or otherwise accessible to, the core 102. The machine instructions 106 comprise an instruction set that includes instructions that may perform a variety of operations. One function that can be implemented through a series of instructions from the instruction set is floating point division (e.g., double precision floating point division). In at least some embodiments, the floating point division operation performed by processor 102 is implemented through the execution of a sign, exponent, and mantissa (SEM) separation instruction 108, one or more instances of an unsigned mantissa division instruction 110, and a merge instruction 112, all of which are explained below.

The floating point division process that can be performed by the processor 100 includes the processor dividing a floating point numerator (NUM) value by a floating point denominator value (DEN). The NUM and the DEN may be 64-bit floating point numbers as noted above. The result of the division is a floating point quotient (QUO). The SEM separation instruction 108 uses the NUM and DEN sign bits to compute a sign bit for the resulting floating point QUO. The SEM separation instruction 108 also extracts the exponent bits from the NUM and DEN and uses them to compute a value indicative of the resulting QUO. Finally, the NUM and DEN mantissas are extracted. The unsigned mantissa division instruction 110 is then executed multiple times to divide the mantissa of the NUM by the mantissa of the DEN. This instruction may be implemented as a conditional subtraction operation. In the example in which the NUM and DEN are 64-bit floating point values and the unsigned mantissa division instruction 110 is able to execute three iterations of the division process in one cycle, the unsigned division instruction 110 may be executed 19 times to produce a sufficient number of mantissa bits for the mantissa taking into account rounding that may be needed. Following the unsigned division of the NUM and DEN mantissas, the processor core 102 executes the merge instruction to merge together the sign, exponent and mantissa values of the quotient. The merge operation assembles the sign, exponent and mantissa values in one register 104.

Figure 2:
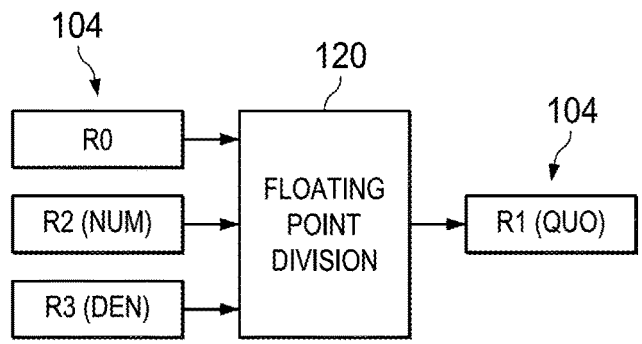
FIG. 2 illustrates the use of registers that include numerator and denominator values in a floating point division operation that in accordance with various examples.

FIG. 2 depicts the use of registers 104 to perform a floating point division process 120 as described herein. NUM is stored in a register 104 designated in this example as R2 and DEN is stored in register R3. Another register R0 is also used during the floating point division operation to store the difference between the exponents of the NUM and DEN. The difference in the NUM and DEN exponents is the exponent of the quotient QUO, which may be adjusted based on whether the resulting quotient mantissa has a 0 or a 1 as its MSB. The completion of the floating point division operation results in the quotient QUO in register R1. The registers 104 may be implemented as shift registers.

Figure 3:
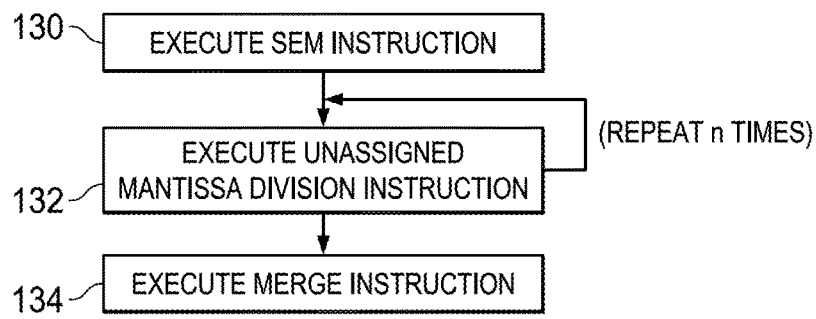
FIG. 3 illustrates an embodiment for performing the floating point division.

FIG. 3 shows a flow chart for implementation of the floating point division process described herein. The processor 100 may perform the operations shown in FIG. 3 through execution of the instructions as shown. At 130, the method includes executing the SEM separation instruction. This instruction may be executed one time in some embodiments. At 132, the method includes executing the unsigned mantissa division instruction. As shown, this instruction is repeatedly executed n times. In some embodiments, this instruction is executed 19 times, and thus n is 18 (i.e., the instruction is initially execute once and then repeated 18 more times for a total of 19 executions of the instruction). Following completion of the division of the numerator and denominator mantissas, the merge instruction is executed at 134 to generate the resulting floating point quotient value. Each of the SEM, unsigned mantissa division, and merge instructions are executable in a single clock cycle, and thus the floating point division operation is advantageously interruptible immediately after the execution of any of these instructions and before the next instruction is executed.

Figure 4:
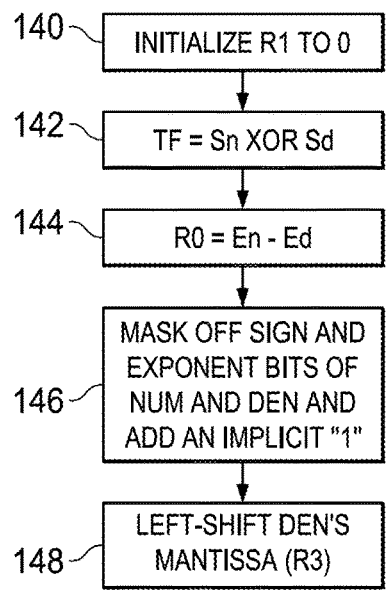
FIG. 4 shows a method for implementation of the sign, exponent, and mantissa separation instruction in accordance with various examples.

FIG. 4 shows an example of various operations that may be performed by the core 102 to implement the SEM separation instruction. The operations may be performed in the order shown, or in a different order. Further, two or more of the operations may be performed concurrently instead of sequentially. At 140, a register R1 (e.g., one of registers 104) is initialized to a value of 0. Register R1 will be used during the execution of the mantissa unsigned division instruction. At 142, a sign flag (TF) is computed as the exclusive-OR of the numerator sign bit (Sn) and the denominator sign bit (Sd). The sign bits may be bits [63] in a 64-bit floating point representation. The exclusive-OR of the numerator and denominator sign bits represents the sign of the resulting quotient. The TF flag bit is saved and used during the subsequent merge instruction to give the quotient the correct sign bit.

At 144, the difference between the exponents of the numerator (En) and the denominator (Ed) is computed with the resulting difference being populated into a register R0 (another one of registers 104). At 146, the sign and exponent bits (the information for which has been saved and/or used in operations 142 and 144) are masked off the registers containing the floating point numerator and denominator. Register R2 contains the floating point numerator and operation 146 causes the bits containing the numerator's sign and exponent bits to be cleared (0). This operation may be performed by logically ANDing the register R2 with a value that has 0's in all bit positions corresponding to the sign and exponent bits and 1's in all other bit positions. Similarly, register R3 contains the floating point denominator and operation 146 also causes the bit fields containing the denominator's sign and exponent bits to be cleared (e.g., also by an AND function). The mantissa also may need to be adjusted to force it to have an implicit '1' as its MSB to make it of the form 1.M. As such, registers R2 and R3 contain only the mantissas of the numerator and denominator, respectively, in this example. At 148, register R3 (which contains the denominator's mantissa) is left-shifted by 1 bit. This left-shift generates the correct mantissa for the quotient using the unsigned division operation. After the left shift, the value in register R2 will be less than the value in register R1 and at least one of the first two condition subtraction operations will result in a '1'.

Figure 5:
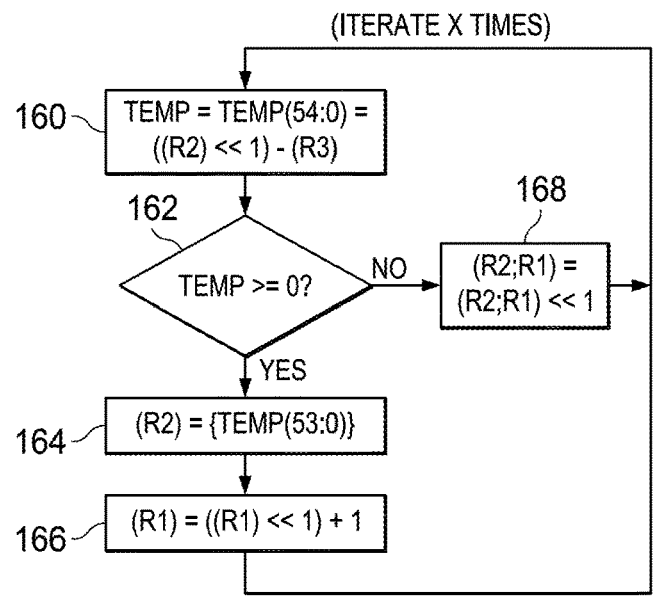
FIG. 5 shows a method for implementation of the unsigned mantissa division instruction.

FIG. 5 illustrates the operations performed by the core 102 to execute the unsigned mantissa division instruction 110. The process is iterative in nature as shown. As explained above, in this example the mantissa of the numerator is stored in register R2 and the mantissa of the denominator is stored in register R3. At 160, the core sets a temporary variable (Temp) to be equal to the value in register R3 (denominator's mantissa) subtracted from the value in register R2 (numerator's mantissa) which has is shifted left by one bit. Temp may be a 55 bit value as shown in this example (i.e., Temp(54:0)).

At 162, the process determines whether the new value of Temp is greater than or equal to 0. If Temp is greater than or equal to 0, then at 164, register R2 is set equal to the lower 54 bits of Temp, that is, (R2)=(temp(53:0)). Further, register R1 is left-shifted by 1 bit, and 1 is then added to the value of register R1 at 166. On the other hand, if Temp is less than 0, then at 168 the process includes left-shifting (R2:R1) by 1 bit. That is, register R1 is left-shifted by 1 bit with the most significant bit from R1 being shifted into the least significant bit of R2 and R2 left-shifted by 1 bit as well.

Following the performance of operations 166 or 168, control loops back to 160 and the process repeats. The process may repeat X times. The iterations of a single execution of the mantissa unsigned division instruction are performed by the core 102 in a single clock cycle. In some embodiments, the process of FIG. 5 is performed three times (i.e., X=2), but the number of iterations of the process for partially computing the mantissa of the quotient may be repeated any suitable number of times. To fully compute the mantissa of the quotient, the mantissa unsigned division instruction may be executed multiple times. In one example, the unsigned mantissa division instruction is executed 19 times, with each execution comprising three iterations. In this example, 57 bits of the quotient's mantissa are computed, which provides extra bits suitable for performing a rounding operation. After executing the mantissa unsigned division instruction the desired number of times to produce the full quotient mantissa, register R1 contains the mantissa of the quotient.

Figure 6:
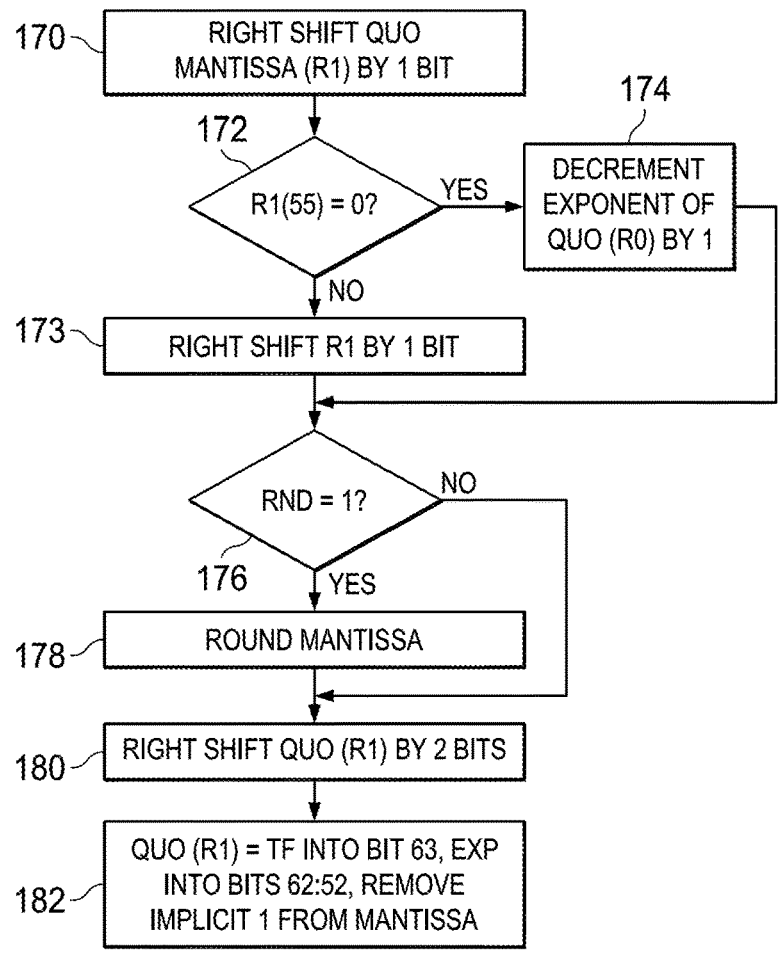
FIG. 6 shows a method for implementation of the merge instruction to merge the resulting sign, exponent and mantissa values to form the resulting floating point quotient in accordance with various examples.

FIG. 6 illustrates an example of an implementation of the merge instructions. The core 102 performs the various operations shown in the example of FIG. 6 and in the order shown or in a different order. At 170, register R1 is right shifted by 1 bit to account for an extra shift due to the execution of the mantissa unsigned division instruction.

At 172, bit 55 of register R1 is examined (for a 64-bit floating point format). If bit 55 is a 0, then the quotient's exponent, which was previously calculated as part of the SEM instruction in register R0, is decremented by 1 at 174. If bit 55 is not a 0, then the contents of register R1 is right shifted at 173. Of the 55 bits in R1, only bits [54:2] are required.

If rounding is specified (e.g., by a rounding flag RND previously designated as 1) and checked at 176, then at operation 178 rounding is performed. In one embodiment, rounding may include adding 1 to bit 2, which is equivalent to adding 0x2 to R1. Rounding also may be performed by checking the values of register R1 and R2 according to the following table. This will help obtain an accurate quotient mantissa within, for example, a 0.5 unit level precision (ULP). The technique described below uses the value of the R1[2:−2] and R2[55:0] to determine whether to round up the quotient's mantissa. The reference to R1 bits [−1, −2] refers to bits which are right-shifted to positions less significant than the least significant bit of the quotient's mantissa.

Rounding Conditions

|   | R1[2:1] | R1[0:−2], R2[55:0] | Round to nearest even |
|---|---------|---------------------|------------------------|
| 1 | 00 | =0 | R1 |
| 2 | 00 | ≠0 | R1 |
| 3 | 01 | =0 | R1 |
| 4 | 01 | ≠0 | R1 + 0 × 4 |
| 5 | 10 | =0 | R1 |
| 6 | 10 | ≠0 | R1 |
| 7 | 11 | =0 | R1 + 0 × 4 |
| 8 | 11 | ≠0 | R1 + 0 × 4 |

R1[2] is the least significant bit of the quotient, while R1[1:−2] are extra quotient bits calculated during the conditional subtraction operations described above. The column labeled "R1[2:1 ]" lists the value of these two bits (00, 01, 10, 11). The column labeled "R1[0:−2], R2[55:0]" refers to whether all of these 59 bits are 0, or whether at least one of the 59 bits is a 1. The last column labeled "round to nearest even" specifies whether to leave the quotient mantissa bits in R1 as-is (no rounding) or whether to add 1 to the least significant bit of the quotient's mantissa, which is R1[2]. As the least significant bit of the quotient's mantissa is R1[2], adding a 1 to that bit can be accomplished by adding 0x4 (binary 100) to register R1.

The core 102 checks the bits noted above and performs rounding when indicated. If R1[2:1] is 00 or 10, then the core 102 does not round up the least significant bit of the quotient's mantissa. If, R1[2:1] is 11, then the CPU core performs rounding. If, R1[2:1] is 01, then the core does not perform rounding if all of the bits R1[0], R2[55:0] are a 0, but if at least one bit of R1[0], R2[55:0] is 1, then the core rounds up the least significant of the mantissa of the quotient (R1[2]).

The register R1 is right shifted at 180 to remove bits [1:0] and use just bits [54:2]. As a result, the mantissa is in bits [52:0] of register R1. Finally, at 182, the full floating value of the quotient is formed in register R1 by merging the sign, exponent and mantissa. For example, the implicit 1 in the mantissa of the quotient (currently bit [52]) is removed. The implicit 1 can be removed by an AND operation of R1 with 0x000FFFFFFFFFFFFF. The exponent bits which were computed and stored in register R0 are placed into bit positions [62:52] of R1. Further, the value of the TF flag (which was computed during execution of the SEM instruction to specify the sign of the quotient) is placed in bit 63 in register R1.

The floating point division operation described herein involves the performance of an unsigned division instruction, which itself is implemented as a conditional subtraction instruction. Integer division also can be performed using conditional subtraction instructions, such as that described in U.S. patent application Ser. No. 15/142,047 titled "Architecture and Instruction Set to Support Integer Division," incorporated herein by reference. Thus, the data path within the core to implement the conditional subtraction instruction for the integer division also can be used to perform floating point division.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
a core;
wherein the core is configured to:
perform a floating point division operation comprising multiple instructions, the floating point division operation comprises:
a sign, exponent, and mantissa (SEM) separation instruction which causes the core to extract the sign, exponent, and mantissa values from numerator and denominator floating point numbers in a first clock cycle, wherein the floating point division operation is interruptible before, during, or after execution of the SEM separation instruction;
an unsigned mantissa division instruction which cause the core to iteratively perform a conditional subtraction operation to compute a value indicative of a mantissa of a quotient in a second clock cycle, wherein the floating point division operation is interruptible before, during, or after execution of the unsigned mantissa instruction; and
a merge instruction that causes the core to generate a quotient floating point number using the extracted sign from the SEM separation instruction in a third clock cycle, the extracted exponent from the SEM separation instruction, and the value indicative of the mantissa of the quotient, wherein the floating point division operation is interruptible before, during, and after execution of the merge instruction.

2. The system of claim 1, wherein the conditional subtraction operations resulted in a mantissa and two extra bits less significant than the least significant bit of the mantissa, and wherein the merge instruction is configured to cause the core to determine whether to round a least significant bit of the mantissa of the quotient based on values of a remainder from the conditional subtraction operations, the least significant bit of the mantissa of the quotient and the two extra bits.

3. The system of claim 1, wherein the merge instruction is configured to cause the core to determine that a most significant bit of the mantissa of the quotient is a 0.

4. The system of claim 3, wherein the SEM instruction causes the core to compute the difference between the exponents extracted from the numerator and denominator floating point numbers, and wherein the merge instruction is configured to cause the core also to subtract 1 from the difference to compute the exponent of the of quotient floating point number.

5. The system of claim 4, wherein the SEM instruction causes the core to compute an exclusive-OR value of the signs extracted from the numerator and denominator floating point numbers.

6. The system of claim 5, wherein the merge instruction causes the core to generate the quotient floating point number using the extracted sign through use of the exclusive-OR value.

7. A method implemented on a processor core, comprising:
    executing a sign, exponent, and mantissa (SEM) separation instruction in a first clock cycle which causes the core to extract the sign, exponent and mantissa values from numerator and denominator floating point numbers;
    receiving a first interruption after the execution of the SEM separation instruction;
    after the first interruption is complete, executing an unsigned mantissa division instruction in a second clock cycle which causes the core to iteratively perform a conditional subtraction operation to compute a value indicative of a mantissa of the quotient;
    receiving a second interruption after the execution of the unsigned mantissa division instruction; and
    after the second interruption is complete, executing a merge instruction in a third clock cycle that causes the core to generate a quotient floating point number using the extracted sign and exponent from the SEM separation instruction and the value indicative of the mantissa of the quotient.

8. The method of claim 7, wherein the unsigned mantissa division instruction is executed multiple times before the merge instruction is executed.

9. The method of claim 7, wherein executing the merge instruction causes the core to determine whether to round a least significant bit of the mantissa of the quotient based at least on values of a remainder from the conditional subtraction operations and the least significant bit of the mantissa of the quotient.

10. The method of claim 7, wherein executing the SEM instruction causes the core to compute the difference between the exponents extracted from the numerator and denominator floating point values, and wherein executing the merge instruction causes the core to determine whether the most significant bit of the quotient's mantissa is a 0 and, if it is, to subtract 1 from the difference to compute the exponent of the quotient floating point number.

11. The method of claim 7, wherein executing the SEM instruction causes the core to compute an exclusive-OR value of the signs extracted from the numerator and denominator floating point numbers and wherein executing the merge instruction causes the core to generate the quotient floating point number using exclusive-OR value.

* * * * *